United States Patent
Rangarajan et al.

(10) Patent No.: US 7,912,204 B1
(45) Date of Patent: Mar. 22, 2011

(54) EMERGENCY ROUTE CONTROL FOR A COMMUNICATION NETWORK

(75) Inventors: Ramaswami Rangarajan, Belmont, CA (US); Gerald Ray Jordan, Jr., Kansas City, KS (US); Warren B. Cope, Olathe, KS (US); Michael Tsai, Cupertino, CA (US); Jia Barton, Foster City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1073 days.

(21) Appl. No.: 11/468,217

(22) Filed: Aug. 29, 2006

(51) Int. Cl.
*H04M 7/00* (2006.01)
(52) U.S. Cl. .................. 379/221.01; 370/392
(58) Field of Classification Search ............. 379/221.01, 379/202; 370/392, 352, 401; 455/445
See application file for complete search history.

(56) References Cited

U.S. PATENT DOCUMENTS

| | | | |
|---|---|---|---|
| 5,260,988 A | 11/1993 | Schellinger et al. | |
| 5,315,636 A | 5/1994 | Patel | |
| 5,724,411 A | 3/1998 | Eisdorfer et al. | |
| 6,032,172 A | 2/2000 | Kutcher | |
| 6,366,576 B1 | 4/2002 | Haga | |
| 6,466,796 B1 | 10/2002 | Jacobson et al. | |
| 6,711,159 B1 | 3/2004 | Grabelsky et al. | |
| 7,242,759 B1 | 7/2007 | Sanchez et al. | |
| 7,298,740 B2 | 11/2007 | Sbisa et al. | |
| 7,457,279 B1 * | 11/2008 | Scott et al. | 370/352 |
| 7,496,184 B2 | 2/2009 | Oborn et al. | |
| 2001/0031635 A1 | 10/2001 | Bharatia | |
| 2004/0032864 A1 | 2/2004 | Sbisa et al. | |
| 2004/0176089 A1 | 9/2004 | Sylvain | |
| 2005/0148353 A1 | 7/2005 | Hicks et al. | |
| 2005/0190789 A1 | 9/2005 | Salkini et al. | |
| 2005/0282543 A1 | 12/2005 | Idnani et al. | |
| 2006/0002311 A1 | 1/2006 | Iwanaga et al. | |
| 2006/0105766 A1 | 5/2006 | Azada et al. | |
| 2006/0270447 A1 | 11/2006 | Everson et al. | |
| 2007/0021118 A1 | 1/2007 | Ophir | |
| 2007/0147358 A1 | 6/2007 | Mikleton et al. | |
| 2008/0025295 A1 | 1/2008 | Elliott et al. | |
| 2008/0130857 A1 | 6/2008 | Marwell et al. | |

* cited by examiner

*Primary Examiner* — William J Deane

(57) ABSTRACT

A route manager queries a new network element to identify egress routes coupled to the network element and to identify external nodes coupled to the egress routes. The route manager queries a database with identifiers for the external nodes to identify associated telephone numbers. For each telephone number associated with an external node, the route manager associates the telephone number with the egress routes coupled to the external node and with the new network element. The route manager receives a call request to one of the telephone numbers, and in response, selects the new network element and one of the egress routes associated with the telephone number.

20 Claims, 10 Drawing Sheets

EMERGENCY ROUTE CONTROL FOR A COMMUNICATION NETWORK

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to the automatic control of routing in a communication network.

2. Description of the Prior Art

A communication network processes telephone numbers to route calls. In some cases, the call route is specified by the identifying egress network element and egress route for the call. For example, when a call is received into the communication network, the communications network processes the telephone number for the call to select the egress network element and egress route. The communication network then routes the call to the egress network element, and the egress network element transfers the call from the communication network over the egress route.

To control this routing, the communication network uses routing tables that associate telephone numbers with egress network elements and egress routes. Unfortunately, a considerable amount of human processing is required to develop these routing tables. This human processing can take a too much time and cost too much. The human processing can also introduce human errors into the routing tables.

In addition, some users have mobile telephone devices that allow the user to move about. In this scenario, the proper egress for a mobile telephone number changes as the user moves about. Users may also have Voice Over Internet Protocol (VOIP) devices that provide calling over the Internet. Like mobile telephones, the proper egress for a VOIP telephone number changes as the user moves about. Some mobile telephones are referred to as multi-mode telephones, because they can operate over either a wireless cellular system and over a VOIP system. This user mobility adds increased complexity to call routing.

SUMMARY OF THE INVENTION

Examples of the invention include a communication system and its method of operation. The communication system includes a new network element that replaces an old network element and that is coupled to egress routes. A route manager queries the new network element to identify the egress routes that are coupled to the new network element and to identify external nodes that are coupled to the egress routes. The route manager receives a response from the new network element that identifies the egress routes that are coupled to the new network element and that identifies the external nodes that are coupled to the egress routes. The route manager queries a database with identifiers for the external nodes to identify telephone numbers that are associated with the external nodes. The route manager receives responses from the database that identify the telephone numbers that are associated with the external nodes. For each one of the telephone numbers that is associated with one of the external nodes, the route manager associates the one telephone number with ones of the egress routes that are coupled to the one external node and associates the one telephone number with the new network element. The route manager receives a call request to one of the telephone numbers, and in response, selects the new network element and one of the egress routes that are associated with the one telephone number. The new network element routes the call over the selected egress route.

In some examples of the invention, the old network element was damaged.

In some examples of the invention, the egress routes coupled to the new network element are transferred from an old network element to the new network element.

In some examples of the invention, some of the egress routes coupled to the new network element are transferred from the old network element to the new network element and some of the other egress routes are new.

In some examples of the invention, one of the external nodes was not coupled to the old network element.

In some examples of the invention, the route manager prioritizes the egress routes that are associated with each of the telephone numbers.

In some examples of the invention, the route manager comprises a Service Control Point.

In some examples of the invention, the identifiers for the external nodes comprise Common Language Location Identifiers.

In some examples of the invention, the database comprises a Local Access and Transport Area (LATA) Architecture Database In some examples of the invention, the telephone numbers are indicated by NPA-NXX.

BRIEF DESCRIPTION OF THE DRAWINGS

The same reference number represents the same element on all drawings.

DETAILED DESCRIPTION OF THE PREFERRED EMBODIMENT

The following description and figures depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Automatic Generation of Route Control Information

Figure 1:
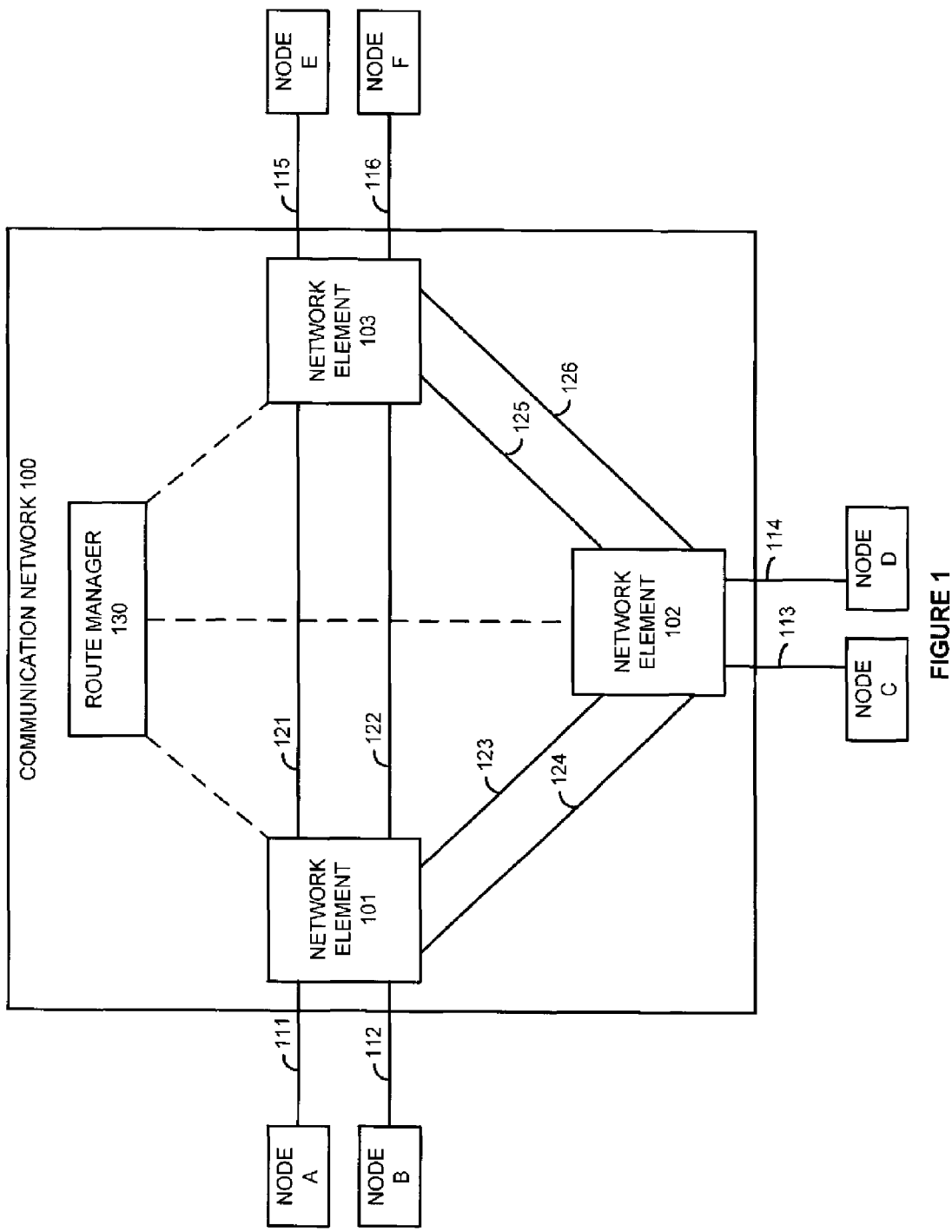
FIG. 1 illustrates a communication network in an example of the invention.

FIG. 1 illustrates communication network 100 in an example of the invention. Communication network 100 includes network elements 101-103, egress routes 111-116, tandem routes 121-126, route manager 130, and control links (indicated by dashed lines). Network element 101 is coupled to egress routes 111-112, tandem routes 121-124, and a control link. Egress routes 111-112 are respectively connected to external nodes A and B. Network element 102 is coupled to egress routes 113-114, tandem routes 123-126, and a control link. Egress routes 113-114 are respectively connected to external nodes C and D. Network element 103 is coupled to egress routes 115-116, tandem routes 121-122 and 125-126, and a control link. Egress routes 115-116 are respectively connected to external nodes E and F. Route manager 130 is coupled to the control links.

Network elements 101-103 could be any telecommunications device or set of devices that route communications based on telephone numbers. Examples of network elements 101-103 could include circuit-based telecommunication switches, telecommunication soft-switches, telecommunication packet switches, telecommunication packet gateways, mobile telecommunication switches, and wireless access points, but there could be other types of network elements.

Route manager 130 could be any computer platform or set of computer platforms that are configured to control communication routing based on telephone numbers as described below. In some examples, route manager 130 could be comprised of service control points and associated management systems. In some examples, route manager 130 could include a Local Access and Transport Area (LATA) Architecture Database (LAD) or an interface to the LAD.

External nodes A-F could be any telecommunications device or set of devices that handle user communications for other communication networks or systems that are external to communication network 100. In some examples, the external node is a telephone central office or similar system that serves the called party.

Egress routes 111-116 could be Time Division Multiplex (TDM) connections, packet connections, optical connections, wireless connections, or some other type of communication path. Tandem routes 121-126 could be Time Division Multiplex (TDM) connections, packet connections, optical connections, wireless connections, or some other type of communication path. The control links could be signaling links, data links, or some other type communication system that allows network elements 101-103 and route manager 130 to exchange messages and instructions. Network elements 101-103 and nodes A-F can also signal each other over other control links that are not shown for clarity.

A telephone number could be any series of numbers that specify at least a portion of the well-known International Country Code (ICC)-Number Plan Area (NPA)-Exchange (NXX)-Line (XXXX). The term "telephone number" means at least some of the digits in the entire telephone number, but the term does require all of the digits in the telephone number. In the examples discussed below, the term "telephone number" refers to the NPA-NXX of the entire telephone number, but the entire telephone number or other portions of the entire telephone number may be used in other examples.

An originating network element is the network element that receives user communications for the call into communication network 100. An egress network element is the network element that transfers the user communications from communication network 100. The originating network element and the egress network element may be the same or they may be different. If they are different, then the originating network element transfers the user communications to the egress network element over a tandem route. The egress network element then transfers the user communications from communication network 100 over an egress route.

The originating network element receives a request for a call to a telephone number. In response to the call, the originating network element transfers a message to route manager 130 indicating the telephone number. Route manager 130 processes the telephone number to determine the egress network element and egress route. Route manager 130 transfers a route instruction to the originating network element indicating the egress network element and the egress route.

The originating network element routes the user communication based on the route instruction. If the originating network element is also the egress network element, then the originating/egress network element routes the user communication from communications network 100 over the egress route. If the originating network element is not the egress network element, then the originating network element transfers the route instruction to the egress network element. The originating network element also determines a tandem route to the egress network element and routes the user communication to the egress network element over the tandem route. In response to the route instruction, the egress network element routes the user communication from communications network 100 over the egress route.

The following table illustrates route control information in an example of the invention.

| ROUTE CONTROL INFORMATION | | |
|---|---|---|
| TELEPHONE NUMBER | EGRESS NETWORK ELEMENT | EGRESS ROUTE |
| 123-999 | 101 | 111 |
| . | . | . |
| . | . | . |
| . | . | . |
| 456-888 | 102 | 113 |
| . | . | . |
| . | . | . |
| . | . | . |
| 789-777 | 103 | 116 |
| . | . | . |
| . | . | . |
| . | . | . |

In response to messages from network elements 101-103, route manager 130 processes the route control information to determine route instructions for network elements 101-103. In the following example, the NPA-NXX of the telephone number is used, but the entire telephone number or a different portion of the telephone number could be used in other examples.

In one example, network element 101 receives a call request to a telephone number with an NPA-NXX of 123-999. Since network element 101 will receive the user communications into communication network 100, network element 101 is the originating network element. In response to the call request, network element 101 transfers a message to route manager 130 indicating the telephone number. Route manager 130 processes the route control information with the telephone number (123-999) to determine that the egress network element is network element 101 and the egress route is egress route 111. Thus, the originating network element is also the egress network element on this call. Route manager 130 transfers a route instruction to network element 101 indicating egress network element 101 and egress route 111. Network element 101 receives the route instruction and the user communications, and since network element 101 is the egress network element, network element 101 transfers the user communications from communication network 100 over egress route 111.

In another example, network element 101 receives a call request to a telephone number with an NPA-NXX of 456-888. Network element 101 is the originating network element. In response to the call request, network element 101 transfers a message to route manager 130 indicating the telephone number. Route manager 130 processes the route control information with the telephone number (456-888) to determine that the egress network element is network element 102 and the egress route is egress route 113. Route manager 130 transfers a route instruction to network element 101 indicating egress network element 102 and egress route 113. Network element 101 receives the route instruction, and since network element 101 is not the egress network element, network element 101 determines a tandem route to egress network element 102. Tandem route determination could be accomplished through a table in network element 101 that associates egress network elements with tandem routes. For example, network element 101 could select either tandem route 123 or 124 to egress network element 102. Alternatively, network element 101 could select tandem route 122 to network element 103, and network element 103 could route the user communication to egress network element 102 over tandem route 126. In this example, network element 101 selects tandem route 124 to network element 102. Network element 101 transfers a route instruction to egress network element 102 indicating egress network element 102 and egress route 113. Network element 101 receives the user communication, and in response, transfers the user communication to egress network element 102 over tandem route 124. Network element 102 receives the route instruction and the user communications, and since it is the egress network element, network element 102 transfers the user communications from communication network 100 over egress route 113.

In another example, network element 101 receives a call request to a telephone number with an NPA-NXX of 789-777. Network element 101 is the originating network element. In response to the call request, network element 101 transfers a message to route manager 130 indicating the telephone number. Route manager 130 processes the route control information with the telephone number (789-777) to determine that the egress network element is network element 103 and the egress route is egress route 116. Route manager 130 transfers a route instruction to network element 101 indicating egress network element 103 and egress route 116. Network element 101 receives the route instruction, and since network element 101 is not the egress network element, network element 101 determines a tandem route to egress network element 103. For example, network element 101 might select tandem route 121 to egress network element 103. Network element 101 transfers a route instruction to egress network element 103 indicating egress network element 103 and egress route 116. Network element 101 receives the user communication, and in response, transfers the user communication to egress network element 103 over tandem route 121. Network element 103 receives the route instruction and the user communications, and since it is the egress network element, network element 103 transfers the user communications from communication network 100 over egress route 116.

If desired, route manager 130 can select the digits to be provided to the external node over the egress route—sometimes referred to as Dialed Number Identification Service (DNIS) digits. This DNIS digit selection is typically based on the called number and possibly the caller number. Route manager 130 would include the selected DNIS digits in its response to the originating network element. The originating network element would include the selected DNIS digits in its route instruction to the egress network element. The egress network element would then transfer the DNIS digits over the egress route to the external node.

Figure 2:
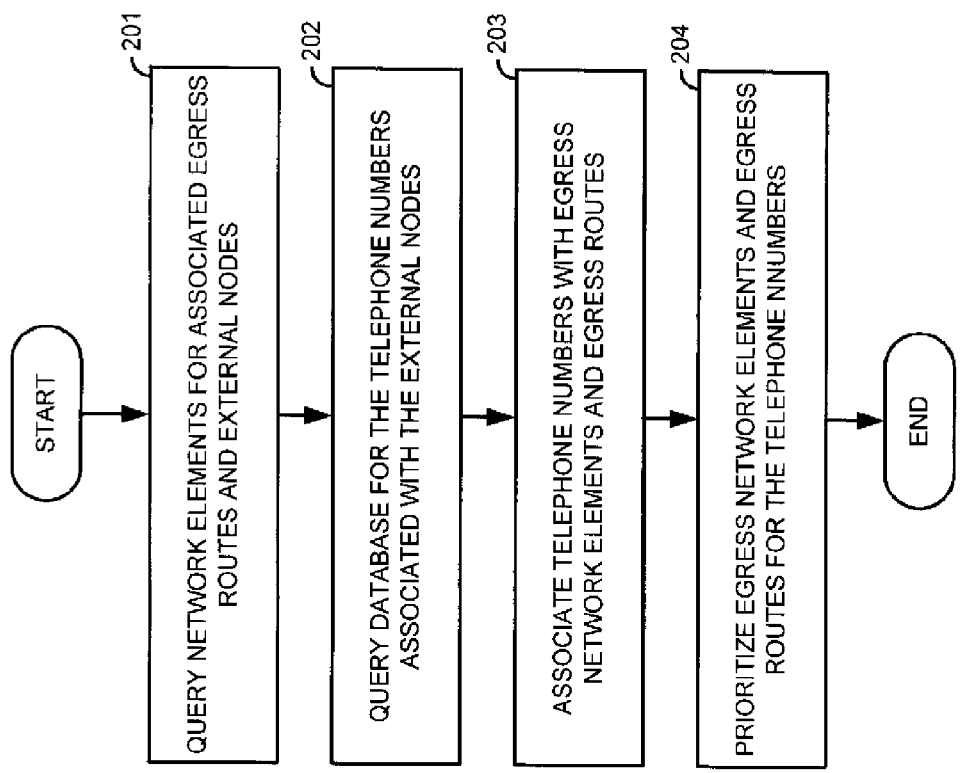
FIG. 2 illustrates the process that the communication network uses to generate route control information in an example of the invention.

FIG. 2 illustrates the process that route manager 130 uses to generate the route control information in some examples of the invention. The reference numbers from FIG. 2 are indicated parenthetically below. Route manager 130 starts the process by querying network elements 101-103 over the control links (201). Each query requests the egress routes and external nodes that are connected to that particular network element. The network element that receives the query responds to route manager 130 by identifying its connected egress routes and external nodes. For example, route manager 130 would query network element 101 for egress routes and external nodes, and network element 101 would respond with egress route 111 to node A and egress route 112 to node B.

Route manager 130 then queries a database to get telephone numbers that are associated with the external nodes identified above (202). The database could be internal or external to route manager 130. One example of such a database is the LAD, and one example of a node identifier is a Common Language Location Identifier (CLLI). For example, route manager 130 could query the LAD with the CLLI for external node A and get the NPA-NXX served by external node A. Thus, route manager 130 determines the egress routes and external nodes that are associated with each network element, and then route manager 130 determines the telephone numbers associated with each external node. Based on these associations, route manager 130 associates the telephone numbers with the egress network elements and the egress routes (203).

For example, route manager 130 queries network element 102 for associated egress routes and external nodes. Network element 102 responds to the request by identifying egress route 113 to external node C and egress route 114 to external node D. Route manager 130 then queries the database with identifiers for external nodes C and D. The database returns the telephone number 456-888 for external node C and 456-333 for external node D. Based on these associations, route manager 130 associates the telephone number 456-888 with egress route 113 which is connected to associated external node C, and associates the telephone number 456-888 with egress network element 102 that is connected to egress route 113. Likewise, route manager 130 associates the telephone number 456-333 with egress route 114 which is connected to associated external node D, and associates the telephone number 456-333 with egress network element 102 that is connected to egress route 114.

Route manager 130 then prioritizes the egress network elements and the egress routes for each telephone number (204). Prioritization is discussed in more detail below. Note that route control information is automatically generated to allow a telephone number to be readily associated with a prioritized list of egress network elements and egress routes. Also note that there may be multiple egress routes and/or network elements that are associated with a given telephone number. Route manager 130 prioritizes these possible egress routes and elements as indicated below.

Automatic Prioritization of Route Control Information

Figure 3:
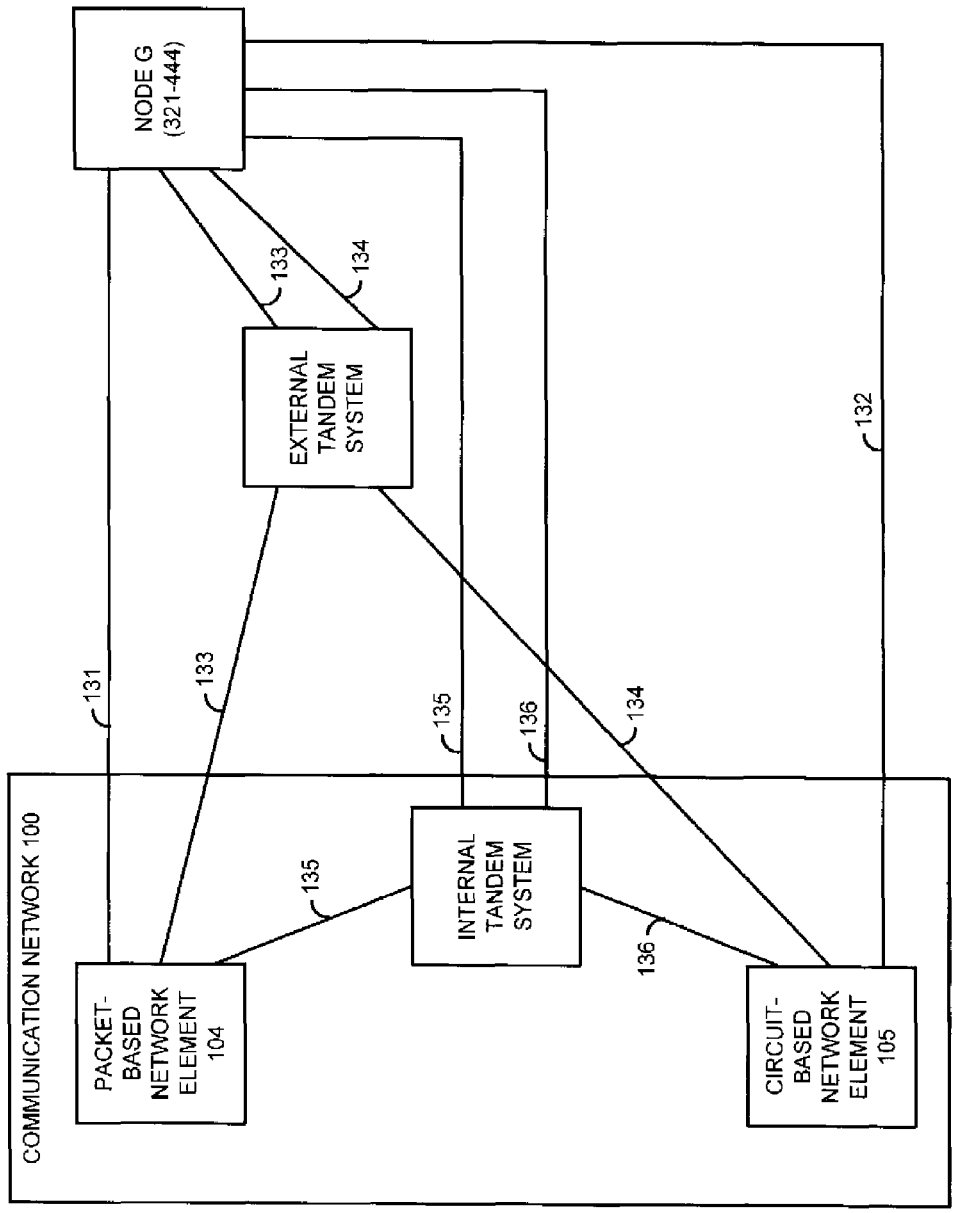
FIG. 3 illustrates the communication network in an example of the invention.

FIG. 3 illustrates communication network 100 in an example of the invention. Communication network 100 also includes packet-based network element 104, circuit-based network element 105, an internal tandem system, and egress routes 131-136 to external node G. FIG. 3 illustrates the prioritization of egress routes 131-136, and several aspects of communication network 100 (route manager 130, network elements 101-103, and routes 111-116 and 121-126) are omitted for clarity.

Consider that external node G serves the NPA-NXX of 321-444. Thus for a telephone call to 321-444, communication network 100 should route the user communication to external node G. There are six potential egress routes 131-136. Egress route 131 is a direct route from packet-based network element 104 to external node G. Egress route 132 is a direct route from circuit-based network element 105 to external node G. Egress route 133 is an indirect route from packet-based network element 104 through the external tandem system to external node G. Egress route 134 is an indirect route from circuit-based network element 105 through the external tandem system to external node G. Egress route 135 is an indirect route from packet-based network element 104 through the internal tandem system to external node G. Egress route 136 is an indirect route from circuit-based network element 105 through the internal tandem system to external node G. A tandem system is any equipment, such as a switch, node, or gateway, that couples two communication paths together to form a route. One example of a prioritization scheme follows below.

1. Direct egress routes to the external node from packet-based egress network elements have the highest priority.
2. Direct egress routes to the external node from circuit-based egress network elements have the second highest priority.
3. Indirect egress routes to the external node from packet-based egress network elements through an external tandem system have the third highest priority.
4. Indirect egress routes to the external node from circuit-based egress network elements through an external tandem system have the fourth highest priority.
5. Indirect egress routes to the external node from packet-based egress network elements through an internal tandem system have the fifth highest priority.
6. Indirect egress routes to the external node from circuit-based egress network elements through an internal tandem system have the sixth highest priority.

Note that direct egress routes are favored over indirect egress routes that use tandem systems. Note that egress routes from packet-based network elements are favored over egress routes from circuit-based network elements. Note that indirect egress routes that use external tandem systems are favored over indirect egress routes that use internal through tandem systems. The following table illustrates prioritized route control information for telephone number 321-444 for communication network 100.

| ROUTE CONTROL INFORMATION | | | |
|---|---|---|---|
| TELEPHONE NUMBER | PRIORITY | EGRESS NETWORK ELEMENT | EGRESS ROUTE |
| 321-444 | 1 | 104 | 131 |
|  | 2 | 105 | 132 |
|  | 3 | 104 | 133 |
|  | 4 | 105 | 134 |
|  | 5 | 104 | 135 |
|  | 6 | 105 | 136 |
| . | . | . | . |
| . | . | . | . |
| . | . | . | . |

Note that the above prioritization scheme is based on hop count, where a direct route has a hop count of one and an indirect route has a hop count of two or more depending on the number of tandem systems in the indirect route. Egress routes with lower hop counts have higher priorities than egress routes with higher hop counts. Thus, egress routes with a hop count of two (one tandem system) have a higher priority than egress routes with a hop count of three (two tandem systems). A group of egress routes that have the same hop count can be prioritized based on other factors, such as their use of external or internal tandem systems, their use of circuit-based or packet-based technology, or some other factors.

Automatic Update of Route Control Information

Figure 4:
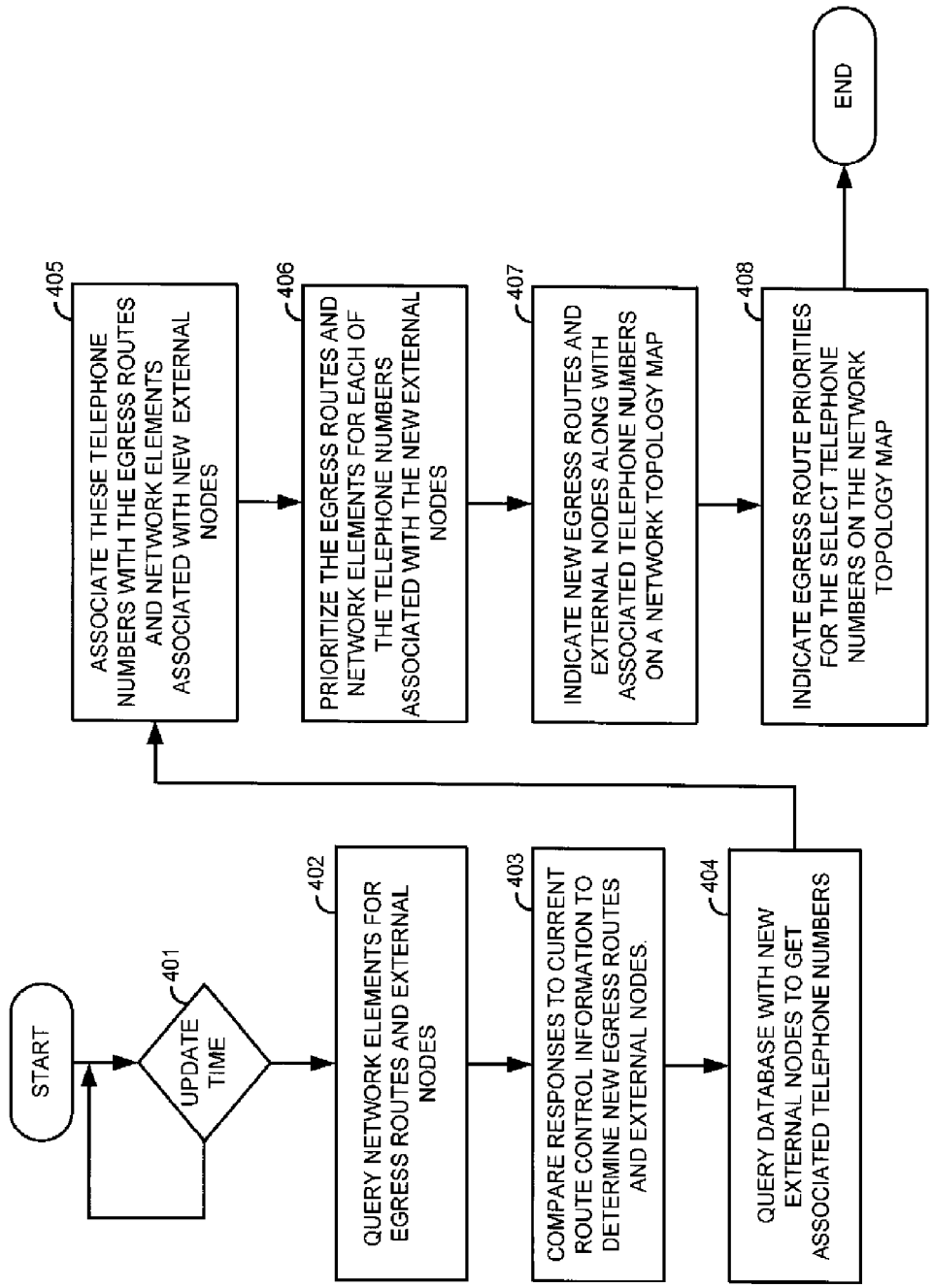
FIG. 4 illustrates the process that the communication network uses to periodically update the route control information in an example of the invention.

FIG. 4 illustrates the process route manager 130 uses to periodically update the route control information in some examples of the invention. The reference numbers from FIG. 4 are indicated parenthetically below. Route manager 130 starts the process by determining if it is time to update the route control information (401). The periodic time may be set any number of ways, such as every hour, every day at midnight, every Saturday night, or some other periodic time requirement.

If it is time to update the route control information, then route manager 130 queries each network element for its associated egress routes and external nodes (402). Route manager 130 compares the responses to the current route control information to identify new external nodes and egress routes (403). For new external nodes, route manager 130 queries the database to determine the telephone numbers that are associated with each new external node (404). Route manager 130 associates each of these telephone numbers with the egress routes and network elements that are associated with the corresponding new external nodes (405). Route manager 130 then prioritizes the egress routes and network elements for each of these telephone numbers associated with the new external nodes (406).

Route manager 130 drives a Graphical User Interface (GUI) to illustrate new egress routes, external nodes, and associated telephone numbers on a network topology map (207). For a telephone number selected on the GUI, route manager 130 drives the GUI to illustrate egress route priorities for that telephone number (408). On the GUI, colors, highlighting, or some other GUI technique can be used to indicate new egress routes, new external nodes, and egress route priorities.

Note that step 403 could be used to determine missing egress routes and external nodes. Route manager 130 could then modify the route control data to remove the missing egress routes and external nodes. Route manager 130 could drive the GUI to illustrate the missing egress routes and external nodes through the use of colors, highlighting, or some other GUI technique. Also, step 403 could be used to determine new egress routes to existing external nodes. Route manager 130 could associate the new egress routes with corresponding telephone numbers for the existing external nodes, and then re-prioritize the egress routes (including the new egress routes) associated with the existing external node and telephone number to optimize use of the new egress routes.

Note that route manager 130 can automatically generate and implement route control information. Alternatively, route manager 130 may automatically generate the route control information, but prior to implementation, the new route control information could be held for review by network operations and after network operations indicates their approval, then route manager 130 would implement the newly generated route control information.

As described above, a network route for communication network 100 comprises the communication paths and elements that transfer the user communications across network 100. The network route is primarily identified by the combination of an egress network element and an egress route. The name for the network route could be the network element identifier and the egress route identifier separated by a delimiter. Thus, the name of a network route could be:

(network element ID, delimiter, egress route ID).

To create a set of unique names for network routes that have same egress network element and egress route, the delimiter could be modified. For example, if a first network route uses network element 25 and egress route 346, then the name of the network route could be 25919346 by using a delimiter of 919. If a second network route also uses network element 25 and egress route 346, then a delimiter of 929 could be used to provide a unique network route name of 25929346. Thus, the digits in the delimiter can be incremented to provide multiple unique names for network routes that use the same egress network element and egress route.

Figure 5:
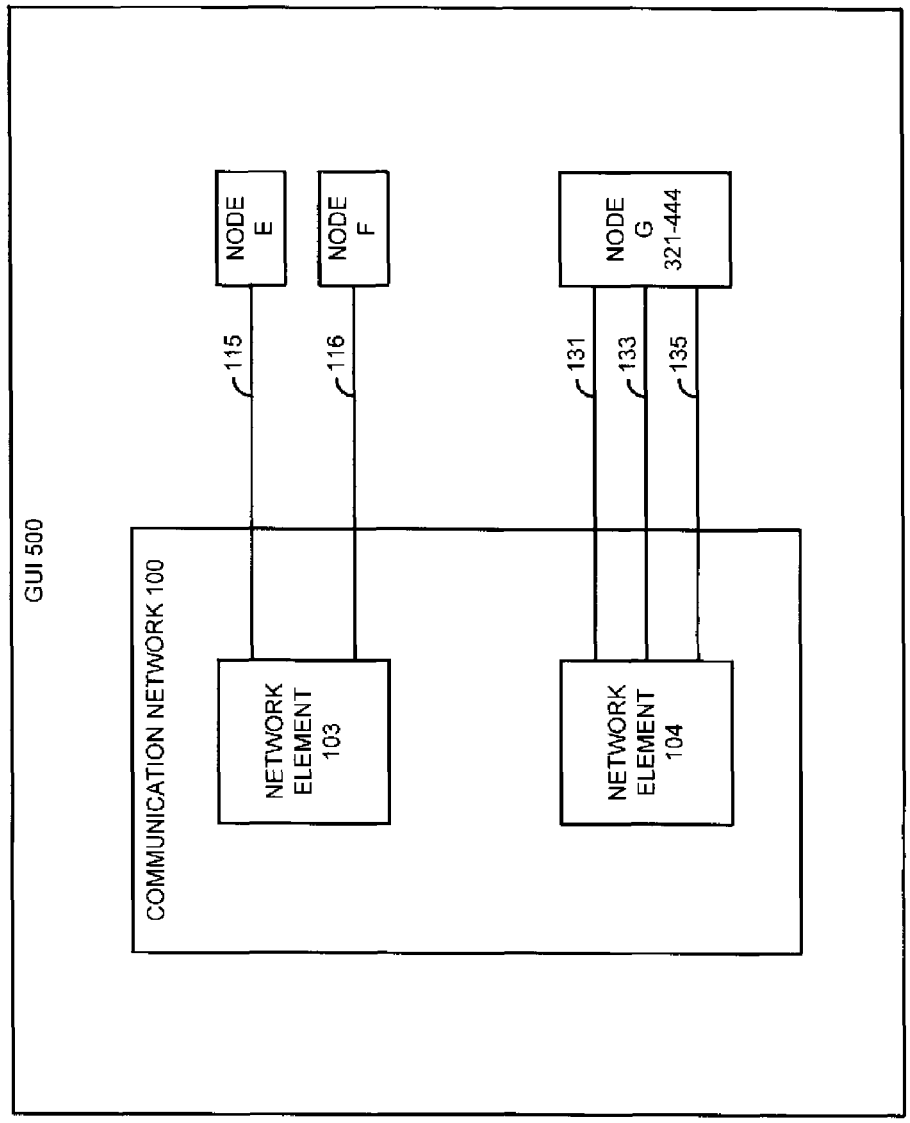
FIG. 5 illustrates a Graphical User Interface (GUI) that the communication network uses to illustrate the route control information in an example of the invention.

FIG. 5 illustrates GUI 500 in an example of the invention. GUI 500 is a part of route manager 130. GUI 500 could be a properly configured computer system with a display screen. Note that GUI 500 illustrates some aspects of communication network 100, but omits some aspects for clarity. GUI 500 depicts network elements 103-104 and egress routes 115-116 and 131, 133, and 135. External nodes E, F, and G are shown outside of communication network 100.

Consider that while performing the periodic update described on FIG. 4, route manager 130 determines that external node F and egress route 116 are new. Route manager 130 could indicate this on GUI 500 by coloring external node F and egress route 116 with a special color (such as green) that indicates new routes and nodes. If an operator selects external node G or its associated telephone number (321-444) on GUI 500, route manager 130 would indicate the priority of egress links 131, 133, and 135 on GUI 500. For example the highest priority egress route (131) could be colored red, the second highest priority egress route (133) could be colored blue, and the third highest priority egress route (135) could be colored yellow.

Automatic Generation of Route Control Information for a New Network Topology

Figure 6:
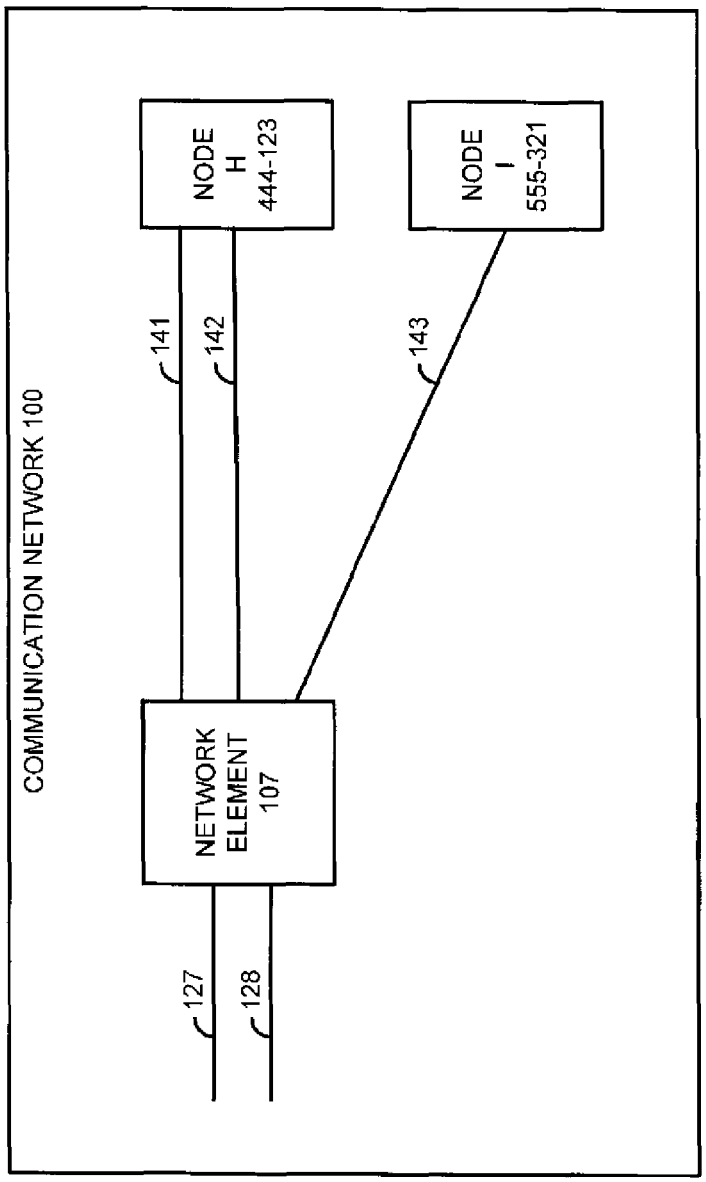
FIG. 6 illustrates the communication network in an example of the invention.
Figure 7:
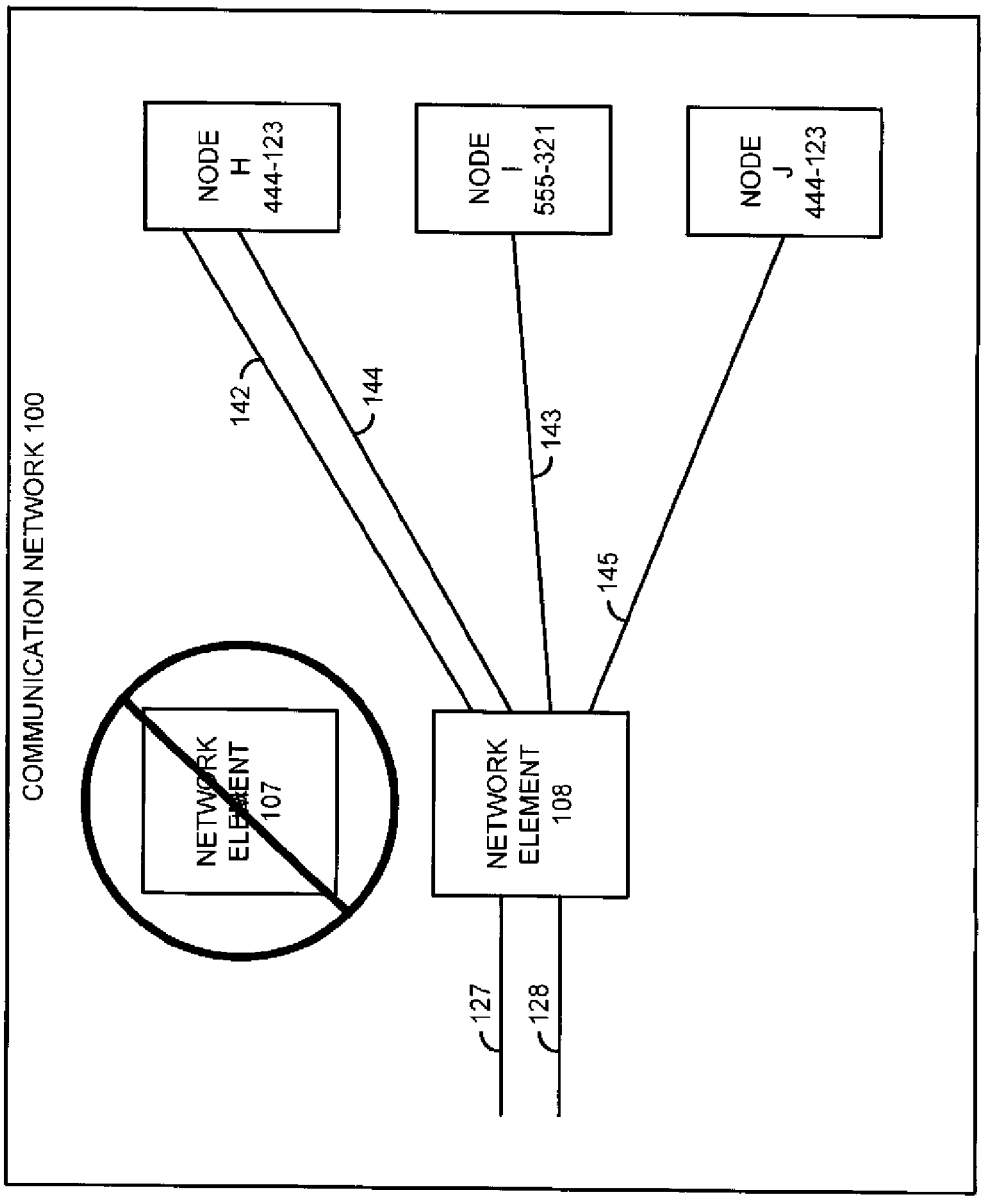
FIG. 7 illustrates the communication network in an example of the invention.

FIGS. 6-7 illustrate communication network 100 in an example of the invention. Note that aspects of communication network indicated above have been omitted for clarity. On FIG. 6, communication network 100 includes network element 107 coupled to tandem routes 127-128 and egress routes 141-143. Egress routes 141-142 are coupled to external node H and egress route 143 is coupled to external node I. External node H is associated with telephone number 444-123, and external node I is associated with telephone number 555-321.

On FIG. 7, network element 107 has been taken out of service. This may be because of standard maintenance or because of an emergency, such as a fire, earthquake, or flood. To re-establish service, the following process occurs. New network element 108 is installed. Tandem routes 127-128 are moved from faulty network element 107 to new network element 108. Egress routes 142-143 are moved from network element 107 to new network element 108. Note that egress route 141 has been taken out of service and is not moved. New egress route 144 has been added between network element 108 and node H. New egress route 145 is added between network element and new external node J. Like external node H, node J also serves the telephone number 444-123.

To generate route control information on-demand for the modified network topology, an operator instructs route manager 130 to perform part of the process of FIG. 4. In response to the operator instruction, route manager 130 queries new network element 108 for its associated egress routes and external nodes. In this case, the response from network element 108 indicates that external node H is coupled to egress routes 142 and 144, external node I is coupled to egress route 143, and external node J is coupled to egress route 145. Route manager 130 then queries the database to determine the telephone numbers that are associated with each external node coupled to new network element 108. Thus, route manager 130 determines that telephone number 444-123 is associated with external nodes H and J, and that telephone number 555-321 is associated with external node I. Route manager 130 associates egress routes 142, 144, and 145 with the telephone number (444-123) corresponding to associated nodes H and J. Route manager 130 also associates egress route 143 with the telephone number (555-321) corresponding to associated node I. Route manager 130 then prioritizes the egress routes and network elements for each of these telephone numbers. Thus, route manager 130 prioritizes egress routes 142, 144, and 145 for the telephone number 444-123 and route 143 for telephone number 555-321. A comparison of the pertinent route control information before and after network element 107 is taken out of service follows below. Note that route priority is indicated by top-down sequence.

| OLD ROUTE CONTROL INFORMATION | | |
|---|---|---|
| TELEPHONE NUMBER | EGRESS NETWORK ELEMENT | EGRESS ROUTE |
| 444-123 | 107 | 141 |
|  |  | 142 |
| 555-321 | 107 | 143 |

| NEW ROUTE CONTROL INFORMATION | | |
|---|---|---|
| TELEPHONE NUMBER | EGRESS NETWORK ELEMENT | EGRESS ROUTE |
| 444-123 | 108 | 145 |
|  |  | 142 |
|  |  | 144 |
| 555-321 | 108 | 143 |

Note that the new route control information can be readily generated and put into service by route manager 130 in a relatively small amount of time.

Automatic Tandem Route Control

Route manager 130 can also control tandem route selection, and this tandem route control is now described with reference to FIG. 1. As discussed above, an originating network element receives a call, and in response, queries route manager 130 for an egress network element and an egress route. If the originating network element is also the egress network element, then that network element transfers the call over the egress route. If the originating network element is not the egress network element, then the originating network element must select a tandem route to the egress network element.

To select the tandem route to the egress network element, the originating network element enters an internal table with the egress network element to yield the tandem route. This internal table is referred to as tandem route control information. Sample tandem route control information for network elements 101-103 follow below. (Note that network elements 190 and 195 are dummy entries that represent network elements 102 and 103 as discussed below).

| NETWORK ELEMENT 101 TANDEM ROUTE CONTROL INFORMATION | |
| --- | --- |
| EGRESS NETWORK ELEMENT | TANDEM ROUTE |
| 102 | 123 |
|  | 124 |
| 103 | 121 |
|  | 122 |
| 190 | 121 |
| 195 | 124 |

| NETWORK ELEMENT 102 TANDEM ROUTE CONTROL INFORMATION | |
| --- | --- |
| EGRESS NETWORK ELEMENT | TANDEM ROUTE |
| 101 | 124 |
|  | 123 |
| 103 | 125 |
|  | 126 |
| 195 | 126 |

| NETWORK ELEMENT 103 TANDEM ROUTE CONTROL INFORMATION | |
| --- | --- |
| EGRESS NETWORK ELEMENT | TANDEM ROUTE |
| 101 | 122 |
|  | 121 |
| 102 | 126 |
|  | 125 |
| 190 | 126 |

Consider a call received by network element 101 to telephone number 456-888. Route manager 130 will return egress network element 102 and egress route 113 for this call to originating network element 101. Since originating network element 101 is not the egress network element, then network element 101 must select a tandem route using its own tandem route control information. For a call to egress network element 102, network element 101 uses tandem route 123 as the first priority, and if that choice is unavailable, network element uses tandem route 124 as the second priority—as specified by the tandem route control information above.

Figure 8:
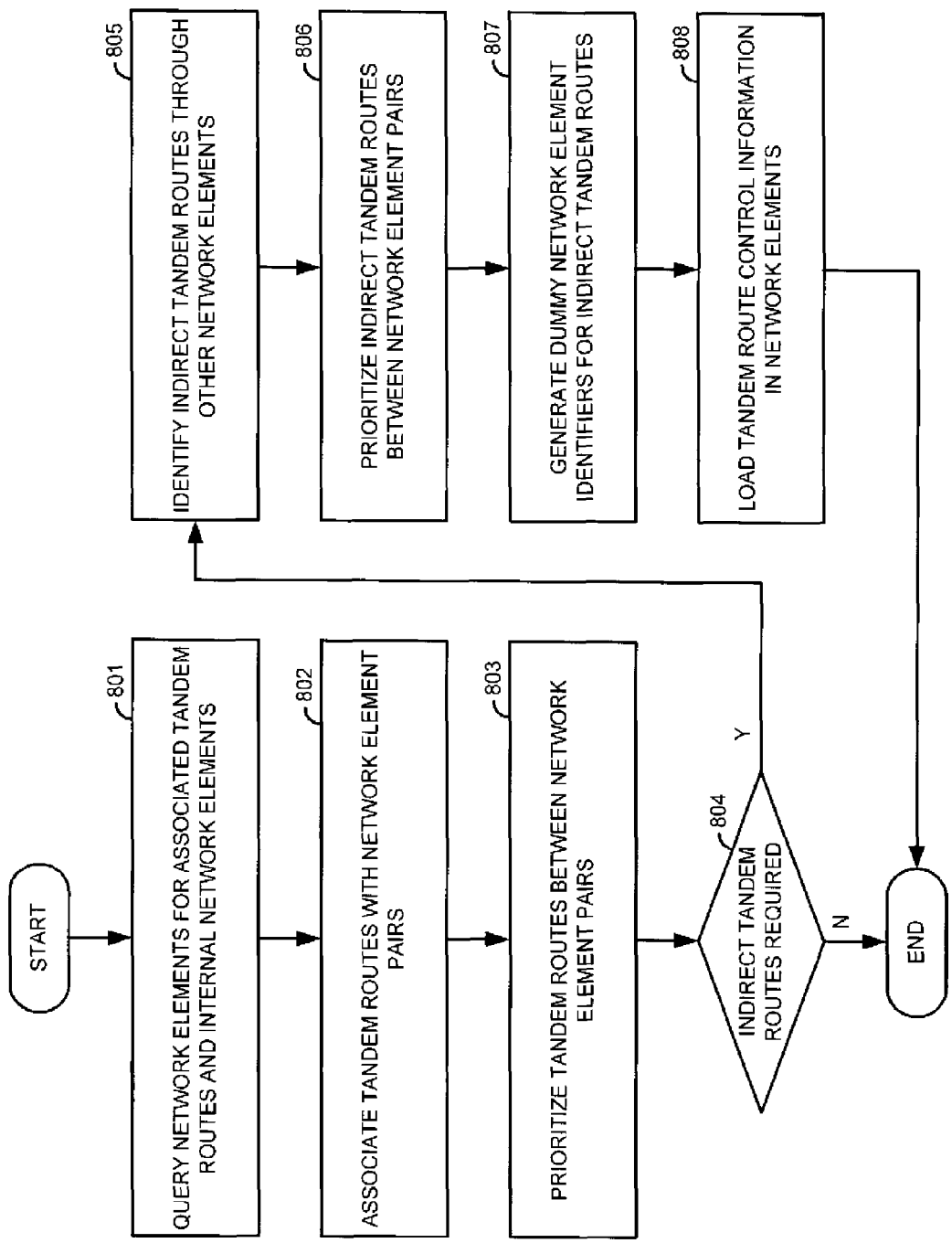
FIG. 8 illustrates the process that the communication network uses to control tandem routes in an example of the invention.

FIG. 8 illustrates a process for route manager 130 to automatically generate tandem route control information. The reference numbers for FIG. 8 are indicated parenthetically below. Route manager 130 starts the process by querying network elements 101-103 for associated tandem routes and network elements (801). For example, network element 101 would respond by identifying tandem routes 121-122 to network element 103 and tandem routes 123-124 to network element 102. Route manager 130 then associates tandem routes with network element pairs (802). For example, tandem routes 121-122 are associated with network element pair 101 and 103. Route manager 130 then prioritizes tandem routes between the network element pairs (803). For example, packet-based tandem routes could get a higher priority than circuit-based tandem routes.

Route manager 130 then determines if indirect tandem routes are needed (804). This determination could be based on the average capacity of the direct tandem routes. For example, if tandem routes 123 and 124 are near maximum capacity, then an indirect tandem route between network elements 101-102 is needed. If an indirect route is needed, route manager determines a common network element for the pair. In this example, network elements 101-102 are both connected to network element 103. Thus, an indirect route between network elements 101-102 can be established through network element 103. Once the needed indirect tandem routes are identified (805), route manager 130 prioritizes the indirect tandem routes (806). The priority could be based on capacity so the more lightly loaded routes are used for indirect tandem routing. In this example, an indirect tandem route between network elements 101-102 is defined through network element 103 using tandem routes 121 and 126. Another indirect tandem route between network elements 101 and 103 is defined through network element 102 using tandem routes 124 and 126.

Route manager 130 generates dummy network element identifiers for the indirect tandem routes (807). For example, the indirect route between network elements 101 and 102 uses the dummy network element 190 in the route control information. Thus, if network element 101 is the originating network element and receives network element 190 as the egress network element from route manager 130, then network element 101 will use tandem route 121 to network element 103, and network element 103 will use tandem route 126 to network element 102. Network element 102 recognizes the dummy network element as itself and uses the appropriate egress connection. Once dummy network elements are assigned to the indirect tandem routes, the tandem route control information is loaded into the appropriate network elements 101-103 (808).

Route manager 130 can direct calls to indirect tandem routes as needed to avoid congested or failed tandem routes. For example, if network element 101 receives a call destined for network element 103 but tandem routes 121-122 are congested, then route control manager 130 returns the dummy egress network element of 195 (instead of network element 103) for originating network element 101 to access the indirect tandem route. Based on the above tandem route control information and in response to dummy network element 195, network element 101 transfers the call over tandem route 124 to network element 102, and network element 102 transfers the call over tandem route 126 to network element 103. Network element 103 recognizes its dummy code and transfer the call over the appropriate egress route.

User Mobility and Automated Route Control

Figure 9:
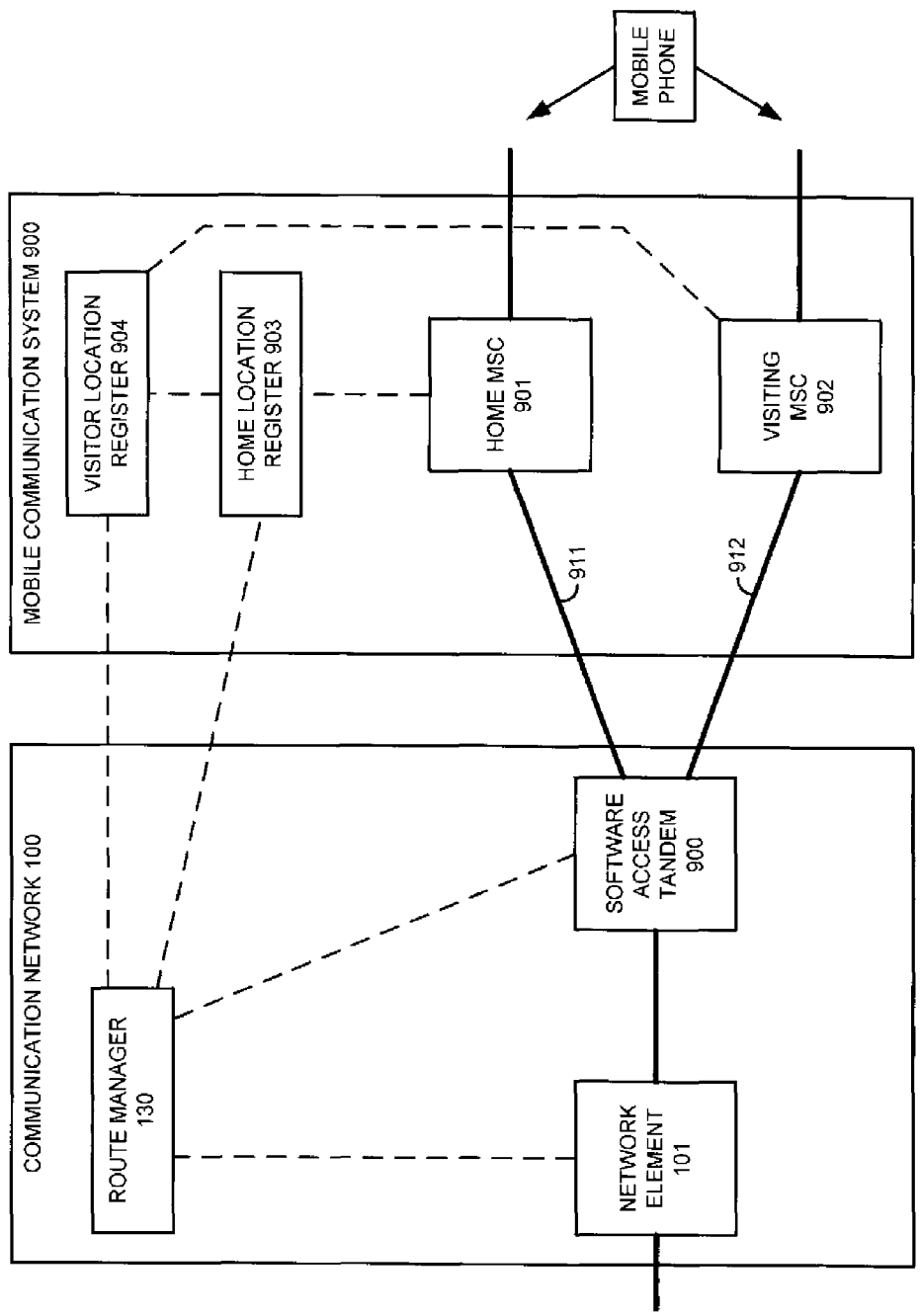
FIG. 9 illustrates the communication network in an example of the invention.

FIG. 9 illustrates communication network 100 in an example of the invention. Note that some aspects of communication network 100 are omitted for clarity. In addition to network element 101 and route manager 130, communication network 100 includes Software Access Tandem (SWAT) 900. In this example, SWAT 900 is an egress network element.

Communication network 100 is coupled to mobile communication system 900. Mobile communication system 900 includes home Mobile Switching Center (MSC) 901, visiting MSC 902, Home Location Register (HLR) 903, and Visitor Location Register (VLR) 904. SWAT 900 is coupled to home MSC 901 by egress route 911. SWAT 900 is coupled to visiting MSC 902 by egress route 912. Note that communication network 100 and mobile communication system 900 could be owned and operated by the same entity.

Mobile communication system 900 serves a mobile telephone that moves about. The mobile telephone is homed to home MSC 901, so when the mobile telephone is in its home area, it registers with home MSC 901, and home MSC 901 indicates to HLR 903 that MSC 901 is currently serving the mobile telephone. When the mobile telephone is moving about, it may visit and register with visiting MSC 902. Visiting MSC 902 (or its HLR) indicates to VLR 904 that MSC 902 is currently serving the mobile telephone, and VLR 904 indicates to HLR 903 that VLR 904 has current location data for the mobile telephone.

In this example, a call to the mobile telephone is received at network element 101, and in response, network element 101 queries route manager 130. Route manager 130 identifies SWAT 900 as the egress network element in the manner described in the above examples. Route manager 130 indicates to network element 101 that SWAT 900 is the egress network element. Note that an egress route is not identified because user mobility must be considered. Network element 101 routes the call to SWAT 900 over a tandem route. In response to the call, SWAT 900 queries route manager 130.

On queries from SWAT 900, route manager 130 must consider user mobility. Thus, route manager 130 must identify the external node (MSC 901 or 902) that currently serves the mobile telephone. Route manager 130 then selects an egress route to the identified external node. Techniques in the examples described above could be used to discover and prioritize the egress routes to each external node, but there is no definite telephone number association with the external nodes because of user mobility. Thus, route manager 130 identifies the proper external node during call set-up, selects the highest priority egress route to the identified external node, and identifies the selected egress route to SWAT 900.

To identify the proper external node, route manager 130 first queries HLR 903 for home MSC 901 to determine if the mobile telephone is currently served by its home MSC 901. If the mobile telephone is in its home area, then HLR 903 indicates to route manager 130 that home MSC 901 is serving the mobile telephone. In response, route manager 130 selects egress route 911 to home MSC 901 and instructs SWAT 900 to use egress route 911 on the call. SWAT 900 extends the call over egress route 911 to MSC 901, and MSC 901 connects the call to the mobile telephone.

If the mobile telephone is visiting MSC 902, then HLR 903 indicates to route manager 130 that VLR 904 should be checked for the current location information. In response, route manager 130 queries VLR 904, and VLR 904 indicates to route manager 130 that visiting MSC 902 is serving the mobile telephone. In response, route manager 130 selects egress route 912 to visiting MSC 902 and instructs SWAT 900 to use egress route 912 on the call. SWAT 900 extends the call over egress route 912 to MSC 902, and MSC 902 connects the call to the visiting mobile telephone.

Note that SWAT 900 queries route manager 130 for routing instructions. Advantageously, SWAT 900 can be configured with far less complex routing logic because it relies on route manager 130 for dynamic routing control. Alternatively, this functionality could be integrated within network element 101, so the egress route could be determined in response to the query from network element 101.

Figure 10:
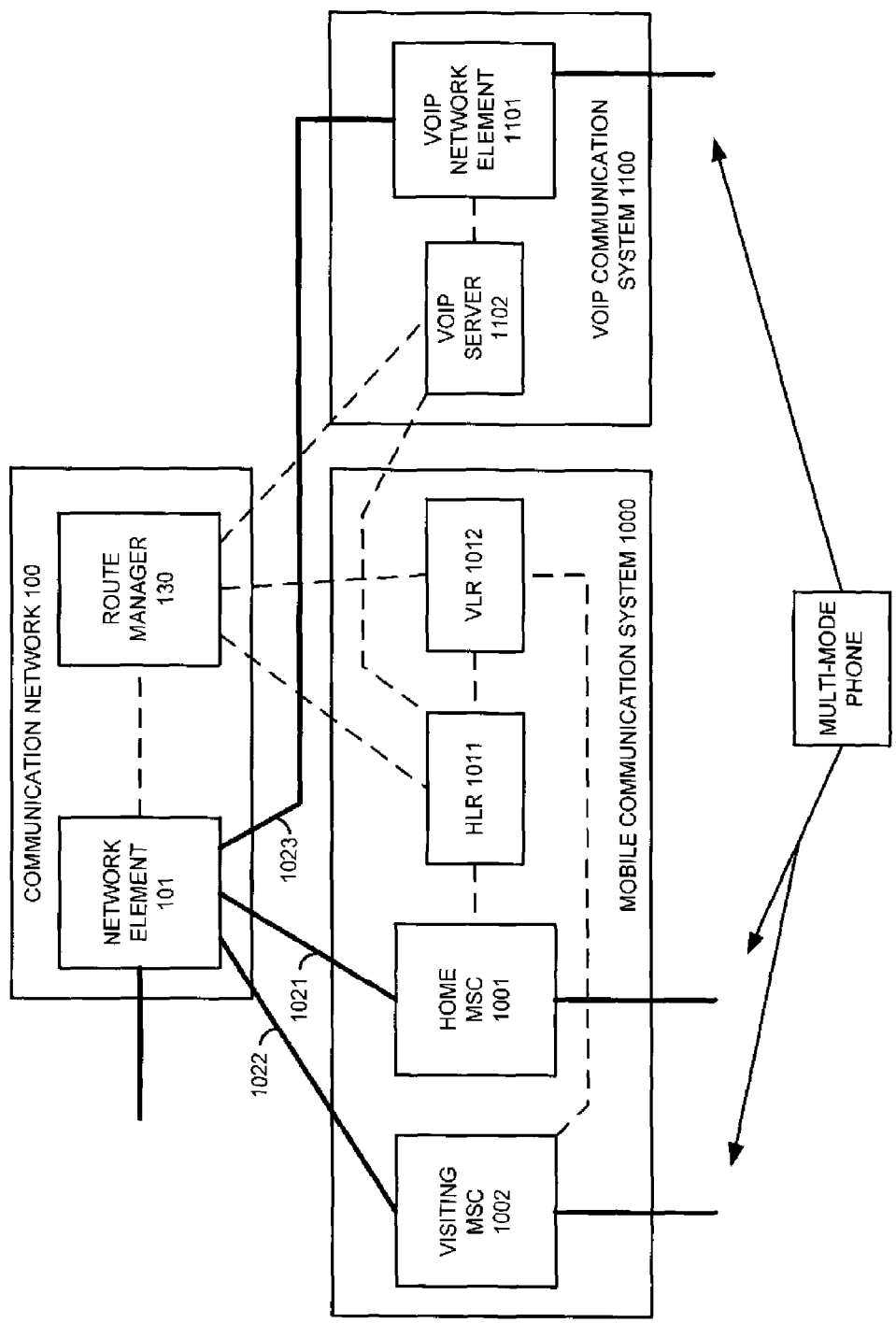
FIG. 10 illustrates the communication network in an example of the invention.

FIG. 10 illustrates communication network 100 in an example of the invention. Note that some aspects of communication network 100 are omitted for clarity. In this example, network element 101 is the originating and egress network element, although separate originating and egress network elements could be used in other examples.

Communication network 100 is coupled to mobile communication system 1000. Mobile communication system 1000 includes home MSC 1001, visiting MSC 1002, HLR 1011, and VLR 1012. Network element 101 is coupled to home MSC 1001 by egress route 1021. Network element 101 is coupled to visiting MSC 1002 by egress route 1022. Note that communication network 100 and mobile communication system 1000 could be owned and operated by the same entity.

Mobile communication system 1000 serves a multi-mode mobile telephone that moves about. The multi-mode telephone is homed to home MSC 1001, so when the multi-mode telephone is in its home area and in the cellular mode, it registers with home MSC 1001, and home MSC 1001 indicates to HLR 1011 that MSC 1001 is currently serving the multi-mode telephone. When the multi-mode telephone is moving about and in the cellular mode, it may visit and register with visiting MSC 1002. Visiting MSC 1002 (or its HLR) indicates to VLR 1012 that MSC 1002 is currently serving the multi-mode telephone, and VLR 1012 indicates to HLR 1011 that VLR 1012 has current location data for the multi-mode telephone.

Communication network 100 is also coupled to Voice Over Internet Protocol (VOIP) communication system 1100. VOIP communication system 1100 includes VOIP network element 1101 and VOIP server 1102. Network element 101 is coupled to VOIP network element 1101 by egress route 1023. VOIP network element 1101 could be a VOIP gateway, VOIP router, or VOIP wireless access point. VOIP server 1102 could be a Session Initiation Protocol (SIP) server.

VOIP communication system 1100 also serves the multi-mode mobile telephone. When in VOIP mode, the multi-mode telephone registers with VOIP server 1102, and VOIP server 1102 indicates to HLR 1011 that VOIP server 1102 is currently serving the multi-mode telephone. Note that communication network 100 and VOIP communication system 1100 could be owned and operated by the same entity.

In this example, a call to the multi-mode mobile telephone is received at network element 101, and in response, network element 101 queries route manager 130. Route manager 130 identifies network element 101 as the egress network element in the manner described in the above examples. For this telephone number, route manager 130 must consider user mobility, because there is not a definite association between the telephone number and an external node. Thus, route manager 130 must identify the external node (MSC 1001, MSC 1002, or VOIP network element 1101) that currently serves the multi-mode telephone. Route manager 130 then selects the highest priority egress route to the identified external node. Techniques in the examples described above could be used to discover and prioritize the egress routes to each external node.

To identify the proper external node, route manager 130 first queries HLR 1011 for home MSC 1001 to determine if the multi-mode telephone is currently served by its home MSC 1001. If the multi-mode telephone is in the cellular mode and its home area, then HLR 1011 indicates to route manager 130 that home MSC 1001 is serving the multi-mode telephone. In response, route manager 130 selects egress route 1021 to home MSC 1001 and instructs network element 101 to use egress route 1021 on the call. Network element 101 extends the call over egress route 1021 to MSC 1001, and MSC 1001 connects the call to the multi-mode telephone.

If the multi-mode telephone is in the cellular mode and visiting MSC 1002, then HLR 1011 indicates to route manager 130 that VLR 1012 should be checked for current location information. In response, route manager 130 queries VLR 1012, and VLR 1012 indicates to route manager 130 that visiting MSC 1002 is serving the multi-mode telephone. In response, route manager 130 selects egress route 1022 to visiting MSC 1002 and instructs network element 101 to use egress route 1022 on the call. Network element 101 extends the call over egress route 1022 to MSC 1002, and MSC 1002 connects the call to the visiting multi-mode telephone.

If the multi-mode telephone is in the VOIP mode and registered with VOIP server 1102, then HLR 1011 indicates to route manager 130 that VOIP server 1102 should be checked for current location information. In response, route manager 130 queries VOIP server 1102, and VOIP server 1102 indicates to route manager 130 that VOIP network element 1101 is serving the multi-mode telephone. In response, route manager 130 selects egress route 1023 to VOIP network element 1101 and instructs network element 101 to use egress route 1023 on the call. Network element 101 extends the call over egress route 1023 to VOIP network element 1101, and VOIP network element 1101 connects the call to the multi-mode telephone.

Alternatively, there may not be a control interface between VOIP server 1102 and HLR 1011. In this case, route manager 130 would query VOIP server 1102 independently. This VOIP query could occur before queries to HLR 1011 and VLR 1012, at the same time as the queries to HLR 1011 and VLR 1012, or after the queries to HLR 1011 and VLR 1012.

Advantageously, route manager 130 can automatically discover and prioritize egress routes to external nodes in mobile communication systems and VOIP communication systems. Route manager 130 can then identify the proper external node during call set-up to account for user mobility, and select the highest priority egress route and egress network element for the call.

We claim:

1. A method of operating a communication system, the method comprising:
installing a new network element and coupling egress routes to the new network element;
querying the new network element to identify the egress routes that are coupled to the new network element and to identify external nodes that are coupled to the egress routes, and receiving a response from the new network element that identifies the egress routes that are coupled to the new network element and that identifies the external nodes that are coupled to the egress routes;
querying a database with identifiers for the external nodes to identify telephone numbers that are associated with the external nodes, and receiving responses from the database that identify the telephone numbers that are associated with the external nodes;
for each one of the telephone numbers that is associated with one of the external nodes, associating the one telephone number with ones of the egress routes that are coupled to the one external node and associating the one telephone number with the new network element;
receiving a call to one of the telephone numbers, and in response, selecting the new network element and one of the egress routes that are associated with the one telephone number;
routing the call to the new network element and routing the call from the new network element over the selected egress route.

2. The method of claim 1 wherein the new network element replaces an old network element that was damaged.

3. The method of claim 1 wherein coupling the egress routes to the new network element comprises transferring the egress routes from an old network element to the new network element.

4. The method of claim 1 wherein coupling the egress routes to the new network element comprises transferring existing ones of the egress routes from an old network element to the new network element and installing new ones of the egress routes.

5. The method of claim 1 wherein the new network element replaces an old network element and wherein one of the external nodes was not coupled to the old network element.

6. The method of claim 1 further comprising prioritizing the egress routes that are associating with each of the telephone numbers.

7. The method of claim 1 wherein selecting the new network element and the selected egress route comprises operating a Service Control Point.

8. The method of claim 1 wherein the identifiers for the external nodes comprise Common Language Location Identifiers.

9. The method of claim 1 wherein the database comprises a Local Access and Transport Area (LATA) Architecture Database.

10. The method of claim 1 wherein the telephone numbers are indicated by NPA-NXX.

11. A communication system comprising:
a new network element that replaces an old network element and that is coupled to egress routes;
a route manager configured to query the new network element to identify the egress routes that are coupled to the new network element and to identify external nodes that are coupled to the egress routes, and to receive a response from the new network element that identifies the egress routes that are coupled to the new network element and that identifies the external nodes that are coupled to the egress routes;
the route manager is configured to query a database with identifiers for the external nodes to identify telephone numbers that are associated with the external nodes, and to receive responses from the database that identify the telephone numbers that are associated with the external nodes;
for each one of the telephone numbers that is associated with one of the external nodes, the route manager is configured to associate the one telephone number with ones of the egress routes that are coupled to the one external node and to associate the one telephone number with the new network element;
the route manager is configured to receive a call request to one of the telephone numbers, and in response, to select the new network element and one of the egress routes that are associated with the one telephone number;
the new network element is configured to route the call over the selected egress route.

12. The communication system of claim 11 wherein the old network element was damaged.

13. The communication system of claim 11 wherein the egress routes coupled to the new network element are transferred from an old network element to the new network element.

14. The communication system of claim 11 wherein some of the egress routes coupled to the new network element are transferred from the old network element to the new network element and some of the other egress routes are new.

15. The communication system of claim 11 wherein one of the external nodes was not coupled to the old network element.

16. The communication system of claim 11 wherein the route manager is configured to prioritize the egress routes that are associated with each of the telephone numbers.

17. The communication system of claim 11 wherein the route manager comprises a Service Control Point.

18. The communication system of claim 11 wherein the identifiers for the external nodes comprise Common Language Location Identifiers.

19. The communication system of claim 11 wherein the database comprises a Local Access and Transport Area (LATA) Architecture Database.

20. The communication system of claim 11 wherein the telephone numbers are indicated by NPA-NXX.

* * * * *